United States Patent [19]

Segard et al.

[11] Patent Number: 4,636,390

[45] Date of Patent: Jan. 13, 1987

[54] PROCESS FOR PRODUCING PROTEIN ALIMENTS AND VARIOUS BY PRODUCTS FROM CEREALS

[75] Inventors: Emile Segard; Philippe Monceaux, both of Compiegne, France

[73] Assignee: Chambre Regionale d'Agriculture de Picardie, Amiens, France

[21] Appl. No.: 578,644

[22] Filed: Feb. 9, 1984

[30] Foreign Application Priority Data

Feb. 22, 1983 [FR] France ................................. 83 02813

[51] Int. Cl.$^4$ .......................... A23J 1/12; C12P 19/14
[52] U.S. Cl. ........................................ 426/18; 426/31; 435/99; 435/255; 99/538
[58] Field of Search ................... 435/99, 96, 254, 255, 435/287, 288; 426/18, 19, 20, 31, 52, 53; 99/538

[56] References Cited

U.S. PATENT DOCUMENTS 4,081,557  3/1978  Azoulay ................................. 426/18
4,217,414  8/1980  Walon .................................... 435/95

Primary Examiner—Lionel M. Shapiro

Attorney, Agent, or Firm—Birch, Stewart, Kolasch & Birch

[57] ABSTRACT

Protein foods are made from cereals by (a) milling the cereal and steeping the milled material in water; (b) mechanically separating the mixture from (a) to produce a sediment (I) containing the major proportion of the insoluble material and starch A, and a suspension (II) containing at least 60% of the nitrogeneous material initially present; (c) subsequently separating the suspension (II) to form an insoluble fraction (III) containing at least 60% of the proteins initially present and a supernatant fraction (IV); (d) mixing the sediment (I) with the supernatant fraction (IV) to form a suspension (V) containing at least 90% of the starch initially preset; (e) hydrolyzing the starch in the suspension (V) by addings thermally stable amylase; (f) separating the hydrolysis mixture from stase (e) to provide a supernatant hydrolysate (VI) and an insoluble fraction (VII); (g) fermenting the insoluble fraction (VII) after suspending it in water to cause an enrichment in yeast protein and (h) separating the fermented suspension from (g) into a recyclable effluent and a sediment comprising high grade food protein.

16 Claims, 3 Drawing Figures

PROCESS FOR PRODUCING PROTEIN ALIMENTS AND VARIOUS BY PRODUCTS FROM CEREALS

BACKGROUND OF THE INVENTION

The present invention concerns a process for producing protein-containing aliments from cereals and for the eventual recovery of starch, in the form of starch hydrolysates, as by-products. It also concerns protein-containing aliments and starch hydrolysates thus obtained as well as an installation for operating this process.

DESCRIPTION OF THE PRIOR ART

Various production processes for proteins and eventually starch are known, materials that are respectively valorized for alimentation (human or animal) or in industry, especially in the glucose industry. It is known that these processes:
necessitate fractionation of the cereal millings in order to separate the shells and fibrous epidermis, germs and various types of amylaceous flours that are more or less rich in proteins;
consume large quantities of water for the physical seperation or strippings and refining of the different solid fractions, separated in suspension.

The processes giving best results require quantities of water at least equal to 3 m$^3$ per ton unrefined cereals, which, other than the effect on investment, raises serious problems of effluents, since the hydrosoluble constituents that represent a minimum of 10% dry matter are carried along in the used waters and are thus lost for valorization.

Indeed, these known methods which concern the separation of proteins and eventually recovery of the starch, also give in the separated form fibres and germs, called bran, sharps or middlings, the nutritive principles of which are generally lost.

BRIEF DESCRIPTION OF THE INVENTION

The object of the present invention is an improved process for processing cereals allowing to overcome the drawbacks of the known processes on the one hand, and, on the other hand, to obtain protein enriched products (in contents of at least 25% of dry matter). This process allows a greater exhaustion of the organic load of the used waters, allowing both a reduced water consumption due to the raised recyclings and a considerable reduction of the reject load. A further advantage of this process is to allow a valorization in human alimentation of the fibrous fractions (bran and sharps) that are enriched in protein (25% dry matter) and can be produced in the form of proteinized biscuits or dry products, such as flakes or various extruded forms.

The present invention concerns a process for producing proteinized aliments from cereals comprising the following steps:
(a) grinding the cereals and soaking the ground product obtained in water;
(b) mechanical separation or stripping of the mixture obtained in step (a) to produce a sediment containing the main part of the insoluble materials and starch A and a suspension containing a minimum of 60% initially present nitrogenous materials;
(c) subsequent separation of the suspension thus produced in step (b) in order to isolate an insoluble fraction containing at least 60% proteins initially present and a remaining floating fraction;
(d) mixture of the sediment obtained in step (b) with the remaining floating fraction of step (c) in order to obtain a final suspension containing a minimum of 90% initial starch;
(e) hydrolysis of the starch contained in this final suspension of step (d) through addition of thermostable amylase;
(f) separation or stripping of the mixture resulting from the hydrolysis of step (e) to collect a remaining floating hydrolysate and an insoluble fraction;
(g) fermentation of the insoluble fraction of step (f) after putting it in suspension in water in order to enrich it in yeast proteins;
(h) separation or stripping of the fermented suspension of step (g) into a recyclable effluent and a sediment constituting a first protein-containing aliment.

According to one embodiment of the invention, soaking is realized under stirring at a temperature lower than or equal to 50° C., the total ground product volume/water present volume ratio being about 1.3/2.5.

According to another embodiment of the invention, soaking is realized in about 20 minutes.

According to a further embodiment of the invention, the mechanical separation of step (b) is carried out by centrifugation or hydrocycloning, so that the distribution at the outlet is formed of 25 to 45% sediment for 55 to 75% suspension, the sediment containing 40 to 55% dry matter and the suspension containing 10 to 20% dry matter.

According to another embodiment of the invention, the subsequent separation of step (c) is carried out after addition to the suspension produced in step (b) of a thermostable amylase, in concentration and activity conditions allowing to solubilize a maximum of 90% residual starch present, the temperature of the suspension being maintained at 90° C.±10° C. for a duration of 10 to 30 minutes.

In another embodiment of the invention, the subsequent separation of step (c) is carried out after addition to the suspension produced in step (b) of a thermostable amylase, in concentration and activity conditions allowing to solubilize a maximum of 90% residual starch present, the temperature of suspension being maintained at 55° C.±5° C. for a duration of 20 to 40 minutes.

In a further embodiment of the invention, the subsequent separation of step (c) is a mechanical separation carried out on the suspension produced in step (b), without any addition of amylase to the suspension, at a temperature lower than or equal to 50° C., so that the remaining floating fraction obtained in step (c) contains a minimum of 90% residual starch present in the initial suspension.

In one embodiment of the invention, the remaining floating fraction produced in step (c) is mixed with the sediment obtained in step (b), the mixture formed being stirred and adjusted by addition of water at a maximum concentration of 25 to 40% dry matter.

According to a further embodiment of the invention, the mixture of the remaining floating fraction produced in step (c) and of the sediment of step (b) is hydrolyzed in step (e) at a pH the value of which is of 6±0.5, at a temperature of 90° C.±10° C. for a settling time of 90 to 150 minutes, the continuous addition of thermostable amylase and its activators, such as Ca$^{++}$ ions, being adjusted so that a maximum of 85% initial starch is hydrolyzed in soluble oligosides.

The present invention furthermore concerns a process for producing protein-containing aliment comprising the following steps:

(a) grinding the cereals and soaking the grinding product obtained in water;

(b) mechanical separation of the mixture obtained in step (a) in order to produce a sediment containing a major part of insoluble materials and starch A and a suspension containing a minimum of 60% initially present nitrogenous materials;

(c) subsequent separation or stripping of the suspension thus produced in step (b) in order to isolate an insoluble fraction containing a minimum of 60% proteins initially present and a remaining floating fraction;

(d) mixture of the sediment obtained in step (b) with the said remaining floating fraction of step (c) to obtain a final suspension containing a minimum of 90% initial starch;

(e) hydrolysis of the starch contained in this final suspension of step (d) by addition of thermostable amylase;

(f) separation or stripping of the mixture resulting from the hydrolysis of step (e) to collect a remaining floating hydrolysate and an insoluble fraction;

(i) fermentation of a remaining floating hydrolysate produced in step (f) at a pH adjusted to a value comprised between 3.0 and 4.5 by a population of yeasts of the *Candida tropicalis* or *Candida utilis* type (the strains of which are approved for human or animal alimentation) at a temperature of 30° C.±5° C.;

(j) separation of the effluent produced to recover a second protein-containing aliment.

According to one embodiment of the invention, the remaining floating hydrolysate produced in the step (f) is subjected to a fermentation (i) with a strain allowing the production of a bioconversion product and the recovery of a fermentation sediment constituting another protein-containing aliment.

Preferably, the effluents produced during the various steps are reusable, at least in part, in the steps necessitating addition of water, on the one hand, and on the other hand the various protein-containing aliments, as such or after addition of a starch-rich flour, can be subjected to the finishing treatment such as baking-extrusion.

The present invention also concerns an installation for operating the above-mentioned process, comprising successively:

a grinding zone for the cereals and soaking of the ground product obtained, a mechanical separation zone of the previously produced suspension, a separation zone of the suspension produced in the preceding zone, a mixing zone of the sediment thus obtained, a hydrolysis zone of the starch contained in the resulting suspension, a separation zone of the mixture formed, a fermentation zone of the separated insoluble fraction, a separation zone of the fermented suspension produced.

Furthermore, the invention concerns an installation comprising successively:

a grinding zone (a) for the cereals and soaking of the ground product obtained, a mechanical separation zone (b) of the suspension produced in the zone (a), a separation zone (c) of the suspension produced in the zone (b), a zone (d) for mixing the sediment obtained in the zone (c), a hydrolysis zone (e) of the starch contained in the suspension obtained in the zone (d), a separation zone (f) of the mixture issuing from the zone (d), a fermentation zone (i) of the remaining floating hydrolysate separated in the zone (f), a separation zone (j) of the fermented suspension produced in the zone (i).

Other aims and advantages of the present invention will appear from reading through the following description and drawings given by way of non-limitative illustration in which.

Figure 1:
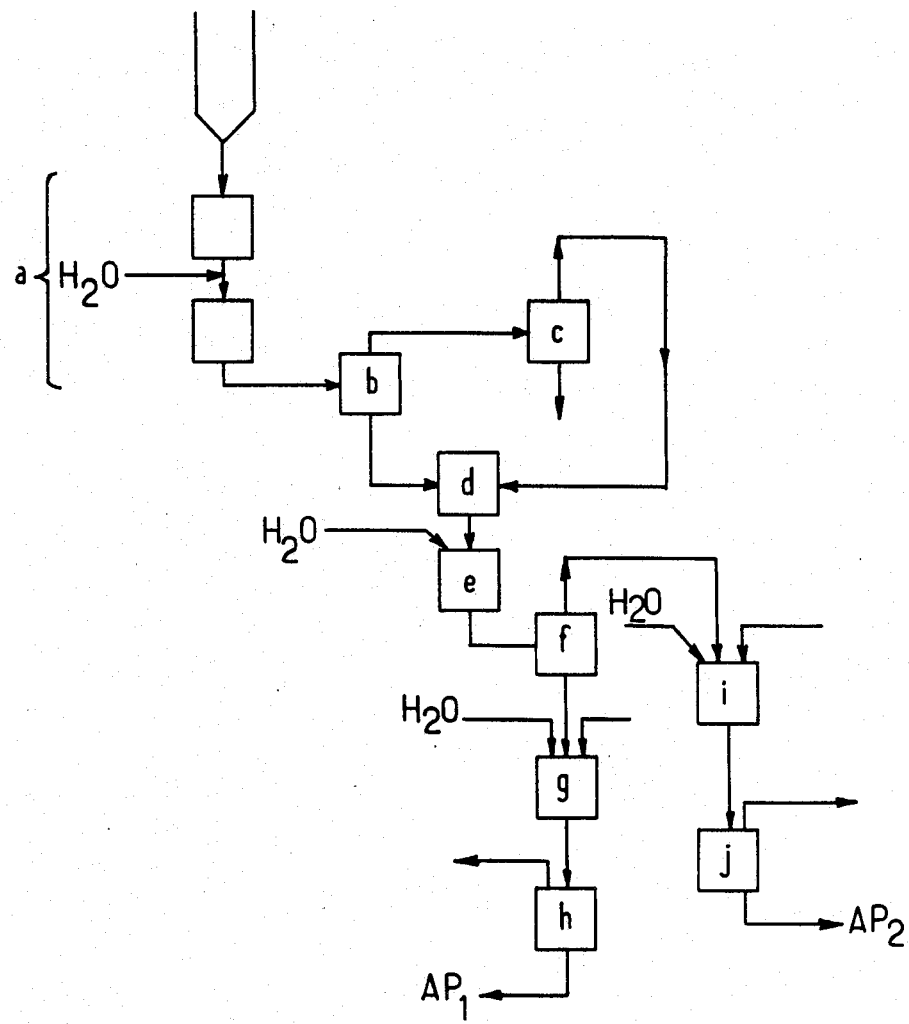
FIG. 1 is a schematic diagram of the process according to the invention.

The raw material to be treated, consisting in a cereal, contained in a hopper 1, is brought by a pipe-line 2 into a grinding zone 10, from which it passes into a soaking zone 12 in which by the pipe-line 11 are brought the recycling waters.

The ground material in 10 is soaked in the soaking zone 12 at 50° C. maximum in recycling waters (2 m$^3$/t unrefined raw material). The raw material is ground in 10 so that the granulometry is such that it allows a separation in 13 of the solid-liquid suspension, giving a remaining floating suspension preferentially containing dispersed proteins (with a variable proportion of sequestered starch, B type starch) and a sediment containing preferentially in mixture the free starch grains (type A) and the germs fibres and various sharps. Any solid-liquid separation mean can be used, according to the type of cereals, such as hydrocyclones or centrifugal separators. Advantageously is used for this separation a horizontal centrifugal screw decarter under conditions adapted to the type of cereal. The remaining floating suspension is subjected in 14 to washing operations, with or without treatment by the amylases according to the relative protein/starch compositions of the lots treated. Recycling waters and clean water, to which has been added or not amylase, are introduced by channels 3 and 4. Known conditions are applied in 14, used to eliminate the starch grains and shell residues, so that, in the final suspension, proteins representing more than 85% dry matter are obtained. At the outlet of operations 14, the suspension is subjected to a solid-liquid separation in 16, so as to collect a protein rich insoluble that in introduced into a mixing vat in 17. The remainder of the separation and the washing waters issuing from 14 contain solution starch that is reassembled in 15 with the insoluble fraction of the separation 13, which allows to reconstitute in 15 a suspension containing the brans and sharps, the starch in grains and solubilized or not starch issuing from the operations realized in 14. The conditions operated in 14 can, furthermore, be a thermal (heating) exchange in the case of the enzymatic treatment or a washing, for example, on a vibrating sieve in the other variant.

The total suspension reconstituted in 15 is sent into the enclosure 20 to which is added again through pipeline 5 thermostable amylase expanded hot so as to liberate the glucose and the oligoglucosides from starches reassembled in the tank 15. Temperature conditions and settling time are adjusted in function of the type of amylase used and the type of cereal treated, so as to hydrolyse as completely as possible the starches present.

The final suspension is subjected to a solid-liquid separation in a separator 21 that supplies a soluble floating remainder collected in the tank 22, and an insoluble fraction sent into the tank 23.

In the tank 22, the soluble floating remainder containing starch hydrolysate is treated, at a pH lower than or equal to 5 and with energetic aeration under agitation, by yeasts of the *Candida tropicalis or Candidia utilis* type, the strains of which are approved for alimentary usages fed by a pipe-line 6. The particular temperature conditions and settling time in the fermentation tank 22 use known data and are adapted, according to the type of cereals treated, to sugar concentrations of the soluble remainder obtained in the separator 21. A solid-liquid separation is realized in the separator 24 in order to collect the yeast cream in a tank 25; then to send it into the mixing vat 17 to obtain in 30 the finished alimentary product $PF_1$; the remainder of the separation 24 is stored in 26, in a buffer vat.

The remainders of the fermentation 24 stored in 26 are mixed in the vat 23 with the insoluble fraction collected during the separation 21. A quantity of clean water necessary to obtain a final suspension comprised between 10 and 18% dry matter is added by pipe-line 7. The fermentation vat 23, maintained at pH lower than or equal to 5 under agitation and aeration, is initially inoculated by yeasts 1 brought by pipe-line 8, of the same type as in the fermentation vat 22 and the temperature conditions and settling time are stabilized in order to allow the consumption of a minimum of 50% soluble sugars present, that are converted into yeasts allowing an enrichment in proteins of the insoluble fraction obtained in the separator 21. At the outlet of the vat 23, a solid-liquid separation is realized in 27 in order to obtain a sediment stored in 28 and the exhausted residual effluents collected in a buffer vat in 29. A proportion of these effluents, variable according to the type of cereals treated, is recycled by pipe-line 11 towards soaking zone 12, the non recycled excedents are eliminated as waste.

The bran and sharps enriched in protein following the fermentation in 23, are dried according to a known method in 27 on a hatmaker type cylinder, for example, in order to obtain a 25% humidity at most, containing a minimum of 25% proteins on dry matter. To this flour stored in vat 28, can advantageously be added in the extruding apparatus 40 about 30% traditional flour of a cereal such as wheat, corn or sorgho and the adequate inredients (saccharose, salts, etc) brought by the pipe-line 9 to obtain by baking-extrusion finished alimentary products PF containing on dry matter about 20% proteins, 20% starch and 60% fibres and others. According to the extrusion conditions in 40, these finished low calorie level (20% starch) protein-containing products can be indifferently in the form of biscuits, flakes, crackers, etc.

Figure 2:
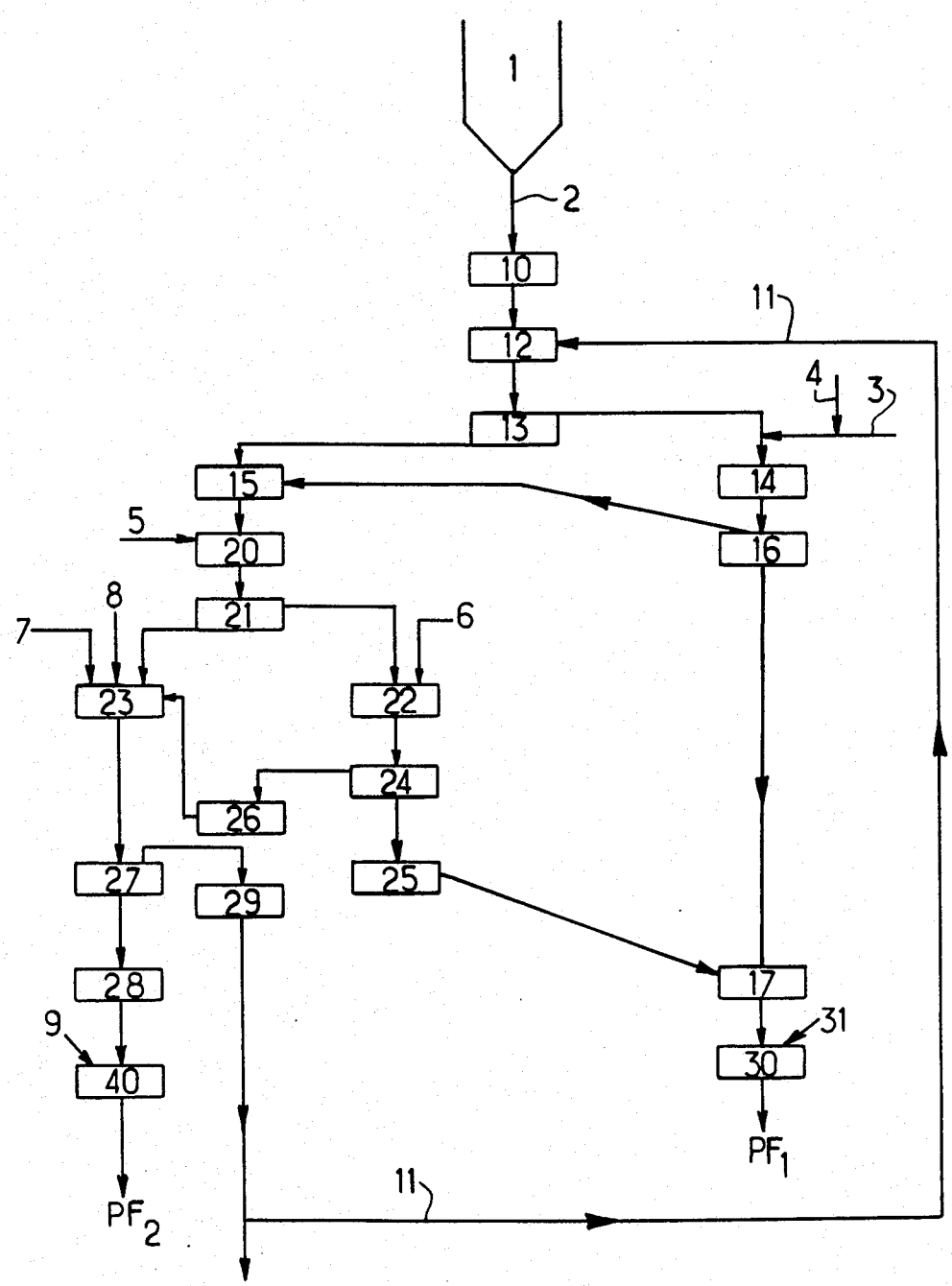
FIG. 2 represents a diagram of a first variation of an installation according to the invention.

According to a variant of FIG. 2, the proteinic fraction issuing from the separator 16 is mixed prior to drying with the biomass of stored yeasts in 25, to obtain a crude flour containing a minimum of 60% proteins on dry matter.

Figure 3:
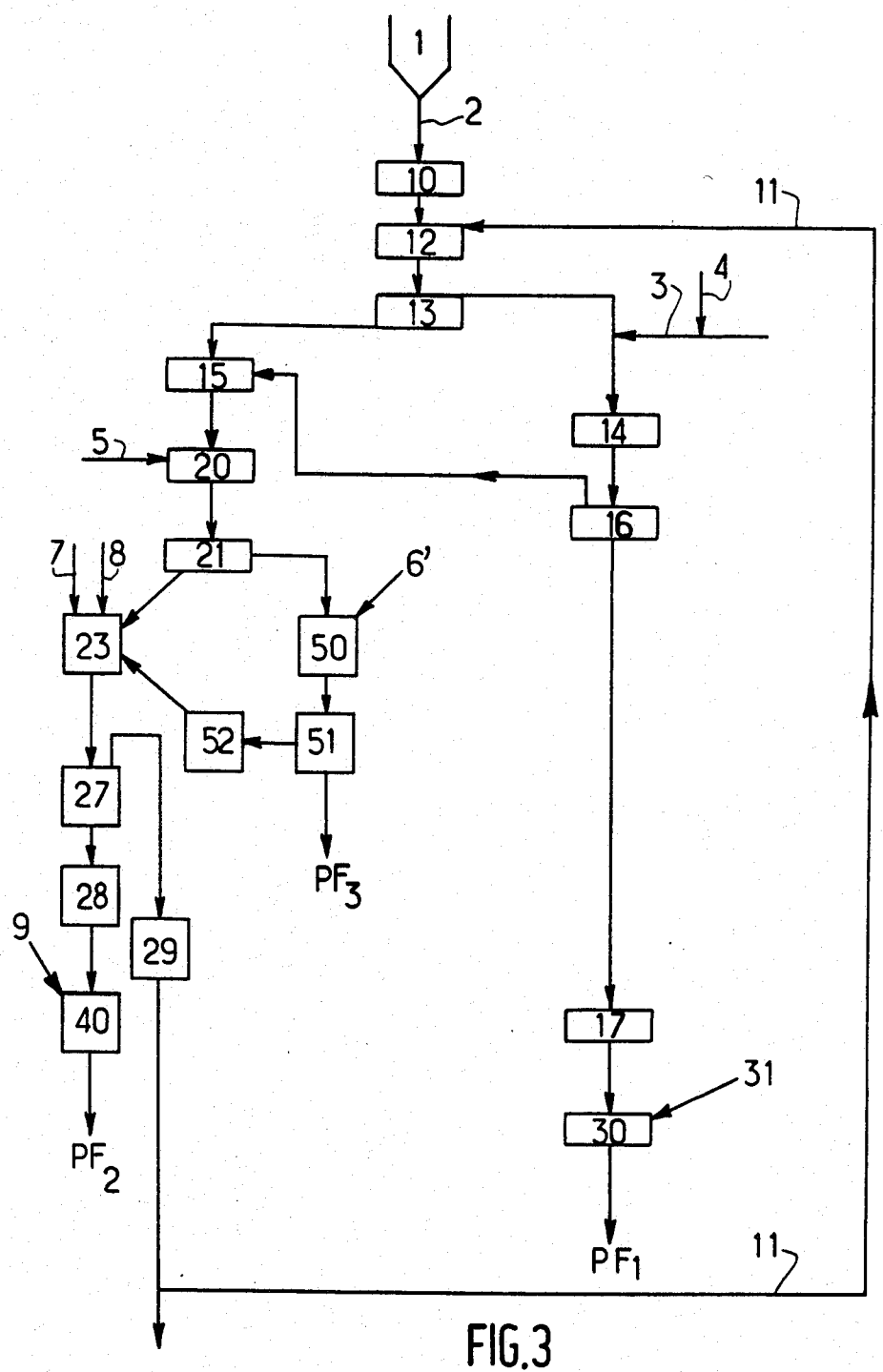
FIG. 3 represents a diagram of a second variant of an installation according to the invention.

According to a variant of the process, described in FIG. 3, the remainder of the separation 21 can be subjected in a fermentation vat 50 to a particular fermentation with an indeterminate strain X brought by the pipe-line 6' allowing to produce by bioconversion a product of highly increased value, that is isolated in 51 by adapted operations allowing to obtain the final product $PF_3$, whereas the waste waters issuing from the extraction of $PF_3$ are stored in 52.

According to this variant of FIG. 2, the proteinic fraction issuing from the separation 16 is directly dried by a known process and an unrefined flour containing at least 70% proteins on dry matter is obtained, the remainders of the fermentation 52 are stored in the buffer vat 50 and sent into the vat 23 where they are reassembled with the insoluble fraction issuing from 21.

It is also advantageously possible to add 50% flour of a cereal such as wheat, corn or sorgho in 30 through pipe-line 31, and to prepare finished products by baking-extrusion under different forms, the final composition of which will be on average 45% starch and 35% proteins on dry matter. The two variants of the present process thus allow, in a resume, to produce protein-containing aliments and eventual by-products according to variant 2, due to combined operations leading to numerous advantages the essential of which is resumed hereunder:

the cereal is used directly in the process, without necessitating any traditional prior cracking operation intended to obtain a degermed flour rid of brans and sharps;

the separation operations are realized in a humid phase by using low biological charge recycling water, which allows to reduce water consumption;

the initial proteins, separated from the beginning with the hydrosoluble fraction are recovered with the maximum yield at a purity level above 70% dry matter due to an enzymatic liquefaction of starch carried out hot, which allows a thermocoagulation of the soluble proteins (this only applying in the case of enzymatic treatment in 14);

the hydrolysis of starch in the presence of bran and sharps allows to produce from the hydrolysate either yeast (variant 1) proteins or bioconversion (variant 2) by products and to enrich in proteins the bran and the sharps;

the two proteic fractions obtained (initial proteins, with or without yeast proteins and its protein-containing bran) can be transformed by baking-extrusion into various finished alimentary products, after a supplementation in starch-rich unrefined flours;

the process can be exploited unbrokenly without difficulty.

The application of the variant of FIG. 1 for the case of wheat is described herein-under by way of non-limitative example.

EXAMPLE Production of protein-containing aliments from unrefined wheat

Unrefined wheat, at a humidity rate of 15% is ground directly (in 10 in a standard grid apparatus in order to obtain an unrefined flour at the outlet the granulometry of which is lower than or equal to 800 microns. The flour is placed in suspension (in 12) in recycling waters brought by pipe-line 11 at a rate of 2 m$^3$ water per ton unrefined flour. Soaking of 30 minutes under stirring is realized at a temperature lower than or equal to 30° C., the most currently at ambient temperature.

The suspension is separated unbrokenly on a horizontal screw separator 13 so that a sediment of 44–45% dry matter (sent into 15) is obtained the protein content (expressed as N ×5.7) of which must be lower than or equal to 5.5% dry matter; this sediment will contain a large proportion of starch superior or equal to 70% dry matter. The floating remainder (sent into 14) containing 12 to 13% dry matter, presents a total protein content (in N ×5.7) of 34 to 35% dry matter. To this suspension will be added a NOVO Thermamyl type amylase preparation (brought by pipe-line 3) at a rate of 120 g enzyme per ton first initial matter and the mixture sent into an exchanger 14 for a thermal exchange at a temperature of 80° C.±10° C. for a settling time of 12 mn±12 mn. At the outlet of the thermal treatment 14, the stirred suspension is introduced into a horizontal decanter 16 to obtain a sediment of 35%-40% dry matter, containing a minimum of 60% proteins (in N ×5.7) present in the suspension subjected to the above treatment (liquefaction-coagulation).

The floating remainder of the separation 16 is mixed with the sediment of the first centrifugation (in 15); this remainder carries along 96 to 97% starch present in the previously hot hydrolysed suspension. To this suspension (through pipe-line 5) is added 700 g of the Thermamyl preparation mentioned herein-above per ton crude input raw material and the whole is maintained under stirring during 2 hr at 95° C., the quantity of $Ca^{++}$ ions being adjusted in function of the enzyme used. On a horizontal decanter 21 the mixture obtained is again separated in order to obtain a sediment of 40-42% dry matter, containing 35 to 38% dry matter in carried out residual total sugars. The remainder corresponding to the starch hydrolysate contains an equivalent in reducing sugars representing, a minimum of 77% true starch initially present in the raw material. This hydrolysate is treated unbrokenly in a vat 22 by a stabilized population of a known strain of *Candida tropicalis* or *Candida utilis*, the whole being maintained during 4 hr at 30° C. and at pH lower than or equal to 4.8, under stirring and aeration; the optimal conditions of this operation use known elements that do not form part of the object of the present invention.

The yeast cream obtained by any separation means 24 contains at least 48% dry matter in proteins (N 6.25) and represents a minimum of 20% true starch initially present in the raw material. This proteic cream is sent into vat 25 where it is mixed with the proteic sediment 17 to be dried (at 10 or 12% residual humidity) by a classic process; a hatmaker drum type dryer can advantageously be used. The dried product will contain a minimum of 40% dry matter in proteins. From this product can be prepared in 30 after addition of starch under any form, various finished products obtained in known conditions, either by baking-extrusion, or by traditional routes used for biscuit manufacture, alimentary pasta or various products. The remainder 26, obtained after incubation (in 22) in the presence of yeasts and containing a maximum of 10% dry matter, is mixed with the sediment of the prior separation 21 in the vat 23.

This latter is provided with the same stirring, aeration and pH control devices as vat 22; a population of *Candida utilis* is kept at 30%; this suspension is maintained during 4 hr of settling time at a pH lower than or equal to 4.8, the dilution being maintained at 15% dry matter by adding water. The separation on horizontal decanter supplies a sediment the protein content of which is at least 25% dry matter of this fraction.

After drying, the product is treated in 40 according to any known process allowing to obtain finished alimentary products. The final remainder 29 contains less than 10% residual dry matter 50% of which is recycled in head.

An example of the average matter table is set out herein-under:

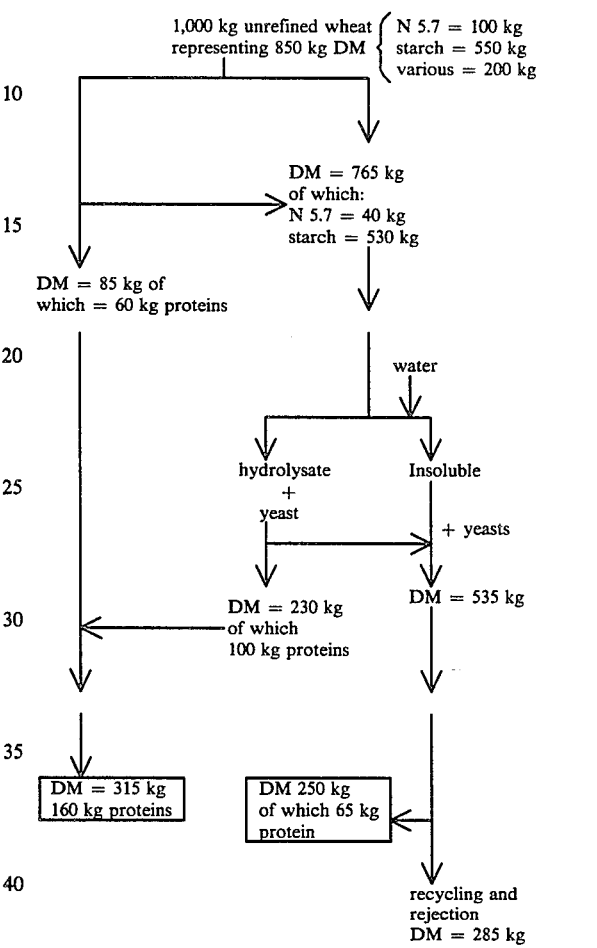

DM = dry matter
N 5.7: the protein content is 5.7 times the determined organic vegetable nitrogen.

We claim:

1. A process for producing protein-containing aliments from cereals, comprising the following steps:
   (a) grinding cereals and soaking the ground product in water;
   (b) separating the soaked ground product obtained in step (a) into a sediment containing substantially insoluble materials and starch A and a suspension containing at least 60% of the initially present nitrogenous materials;
   (c) isolating from the suspension in step (b) an insoluble fraction containing at least 60% of the proteins intially present and a remaining floating fraction;
   (d) mixing the sediment obtained in step (b) with the remaining floating fraction of step (c) to obtain a suspension containing at least 90% of the initial starch;
   (e) hydrolyzing the starch contained in the suspension of step (d) by addition of thermostable amylase;
   (f) separating, and collecting from the hydrolysis of step (e) a remaining floating hydrolysate and an insoluble fraction;

(g) fermentating a mixture comprising the insoluble fraction of step (f), water and yeast, whereby such mixture becomes protein enriched; and (h) separating the fermented mixture of step (g) into a recycling effluent and a sediment containing a first protein-containing aliment.

2. The process according to claim 1, wherein soaking is at a temperature lower than or equal to 50° C., the total ground product/water volumetric ratio is about 1.3/2.5 and the soaked ground product is stirred.

3. The process according to claim 2, wherein the soaking is for about 30 minutes.

4. The process according to claim 1, wherein the separation of step (b) is by centrifugation of hydrocycloning and an outlet distribution is formed of 25 to 45% sediment for 55 to 75% suspension produced in step (b), the sediment containing from 40 to 55% dry matter and the suspension containing from 10 to 20% dry matter.

5. The process according to claim 1, wherein the isolation of an insoluble fraction of step (c) follows the addition to the suspension produced in step (b) of a thermostable amylase, the amylase concentration and activity concentrations allowing solublizing a minimum of 90% residual starch present, and the temperature of the suspension being maintained at 90°% ±10° C. for 10 to 30 minutes.

6. The process according to claim 1, wherein the insolation of an insoluble fraction of step (c) follows the addition to the suspension produced in step (b) of a thermostable amylase, the amylase concentration and activity conditions allowing solubilizing a minimum of 90% residual starch present, and the temperature of the suspension being maintained at 55°% ±5° C. for 20 to 40 minutes.

7. The process according to claim 1, wherein the isolution of an insoluble fraction of step (c) is a mechanical separation of the suspension produced in step (b) without any addition of amylase to the suspension, at a temperature lower than or equal to 50° C. and the remaining floating fraction obtained in step (c) contains a minimum of 90% residual starch present in the initial suspension.

8. The process according to claim 1, wherein the remaining floating fraction produced in step (c) is reassembled with the sediment obtained in step (b) forming a mixture and adjusted by adding water at a maximal concentration of 25% to 40% dry matter.

9. The process according to claim 1, wherein the mixture of the remaining fraction produced in step (c) and of the sediment of step (b) is hydrolysed in step (e) at a pH of 6°±0.5, at a temperature of 90° C.±10° C., for a settling time of 90 to 150 minutes, the continuous addition of thermostable amylase and activators being adjusted so a minimum of 85% initial starch is hydrolysed in soluble oligosides.

10. The process according to claim 1, wherein the remaining hydrolysate produced in step (f) is fermented in step (i) at a pH between 3.0 and 4.5 by *Candida tropicalis* or *Candida utilis* type yeasts, at a temperature of 30°C. ±5° C. and a second protein-containing aliment is recovered after separation of the effluent in step (j).

11. The process according to claim 1, wherein the remaining hydrolysate produced in step (f) is fermented in step (i) producing a bioconversion product and a fermentation sediment is recovered containing a protein-containing aliment.

12. The process according to claim 1, wherein the effluent produced during the various steps are at least partically reused in step necessitating the addition of water.

13. The process according to claim 1, wherein the various protein-containing aliments, as such or after adding a starch rich flour, are subjected to a finishing treatment.

14. The process according to claim 13, wherein the finishing treatment is baking-extrusion.

15. An installation for producing protein-containing aliments from cereals, which comprises:
a grinding zone (a) for grinidng the cereals and soaking the ground product obtained;
a separation zone (b) for separating the suspension obtained in zone (a) into a sediment contained substantially insoluble materials and starch A and a suspension containing at least 60% of the initially present nitrogenous materials;
a zone (c) for separating the suspension produced in zone (b) into an insoluble fraction containing at least 60% of the proteins initially present and a remaining floating fraction;
a mixing zone (d) for mixing the sediment obtained in zone (b) with the remaining floating fraction of zone (c) to obtain a suspension containing at least 90% of the initial starch;
a hydrolyis zone (e) for hydrolyzing the starch contained in the suspension obtained in zone (d) by addition of thermostable amylase;
a separation zone (f) for separating the mixture resulting from the hydrolysis in zone (e) into a floating hydrolysate fraction and an insoluble fraction;
a fermentation zone (g) for fermentating a mixture comprising the insoluble fraction from zone (f), water and yeast into a protein enriched mixture; and
a separation zone (h) for separating the fermented mixture from zone (g) into a recycling effluent and a sediment containing a first protein-containing aliment.

16. An installation for producing protein-containing aliments from cereals, which comprises:
a grinding zone (a) for grinding the cereals and soaking the ground product ontained;
a separation zone (b) for separating the suspension obtained in zone (a) into a sediment containing substantially insoluble materials and starch A and a suspension containing at least 60% of the initially present nitrogenous materials;
a separation zone (c) for separating the suspension produced in zone (b) into an insoluble fraction containing at least 60% of the proteins intially present and a remaining floating fraction;
a mixing zone (d) for mixing the sediment obtained in zone (b) with the remaining floating fraction of zone (c) to obtain a suspension containing at least 90% of the initial starch;
a hydrolysis zone (e) for hydrolyzing the starch contained in the suspension obtained in zone (d) by addition of thermostable amylase;
a separation zone (f) for separating the mixture resulting from the hydrolysis in zone (e) into floating hydrolysate fraction and an insoluble fraction;
a fermentation zone (i) for fermentating a mixture comprising the floating hydrolysate fraction of zone (f), water and yeast into a protein enriched mixture; and
a separation zone (j) for separating the fermented mixture from zone (i) into a recycling effluent and a sediment containing a second protein-containing aliment.

* * * * *